(12) United States Patent
Hillman et al.

(10) Patent No.: US 7,831,813 B2
(45) Date of Patent: Nov. 9, 2010

(54) USES OF KNOWN GOOD CODE FOR IMPLEMENTING PROCESSOR ARCHITECTURAL MODIFICATIONS

(75) Inventors: Garth D. Hillman, Lakeway, TX (US); Geoffrey Strongin, Austin, TX (US); Andrew R. Rawson, Austin, TX (US); Gary H. Simpson, Framingham, MA (US); Ralf Findeisen, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 416 days.

(21) Appl. No.: 11/957,848

(22) Filed: Dec. 17, 2007

(65) Prior Publication Data
US 2009/0158015 A1 Jun. 18, 2009

(51) Int. Cl.
G06F 9/455 (2006.01)
(52) U.S. Cl. ..................................................... 712/226
(58) Field of Classification Search ........................ None
See application file for complete search history.

(56) References Cited

U.S. PATENT DOCUMENTS

| | | | | | |
|---|---|---|---|---|---|
| 5,790,825 | A | * | 8/1998 | Traut | 712/209 |
| 6,009,261 | A | * | 12/1999 | Scalzi et al. | 703/26 |
| 6,041,402 | A | * | 3/2000 | Cannon et al. | 712/200 |
| 6,338,435 | B1 | * | 1/2002 | Carper | 235/487 |
| 6,390,374 | B1 | * | 5/2002 | Carper et al. | 235/492 |
| 6,438,737 | B1 | | 8/2002 | Morelli et al. | |
| 7,039,776 | B2 | * | 5/2006 | Wong et al. | 711/159 |
| 7,290,081 | B2 | * | 10/2007 | Parthasarathy et al. | 711/102 |
| 2002/0120810 | A1 | * | 8/2002 | Brouwer | 711/103 |
| 2003/0217227 | A1 | * | 11/2003 | Parthasarathy et al. | 711/118 |
| 2005/0278551 | A1 | | 12/2005 | Goodnow et al. | |
| 2006/0059574 | A1 | | 3/2006 | Fayad et al. | |

OTHER PUBLICATIONS

U.S. Appl. No. 11/957,930, filed Dec. 17, 2007.
Intel, "Intel Trusted Execution Technology," Technology Overview, 2 pages, 2007.
Intel, "Intel Trusted Execution Technology-Architectural Overview," 8 pages, 2003.
Intel "Intel Trusted Execution Technology," Preliminary Architecture Specification, 102 pages, Aug. 2007.

* cited by examiner

Primary Examiner—Eric Coleman
(74) Attorney, Agent, or Firm—Lawrence J. Merkel; Meyertons, Hood, Kivlin, Kowert & Goetzel, P.C.

(57) ABSTRACT

In one embodiment, a processor comprises a programmable map and a circuit. The programmable map is configured to store data that identifies at least one instruction for which an architectural modification of an instruction set architecture implemented by the processor has been defined, wherein the processor does not implement the modification. The circuitry is configured to detect the instruction or its memory operands and cause a transition to Known Good Code (KGC), wherein the KGC is protected from unauthorized modification and is provided from an authenticated entity. The KGC comprises code that, when executed, emulates the modification. In another embodiment, an integrated circuit comprises at least one processor core; at least one other circuit; and a KGC source configured to supply KGC to the processor core for execution. The KGC comprises interface code for the other circuit whereby an application executing on the processor core interfaces to the other circuit through the KGC.

20 Claims, 7 Drawing Sheets

USES OF KNOWN GOOD CODE FOR IMPLEMENTING PROCESSOR ARCHITECTURAL MODIFICATIONS

BACKGROUND

1. Field of the Invention

This invention is related to the field of processors and computer systems, and more particularly to the use of known good code in such systems to enable processor architecture extensions, control on-board devices, and other uses.

2. Description of the Related Art

Processors are designed to execute instructions defined in an instruction set architecture (ISA). The ISA defines the instructions, how they are encoded, and what operations occur when they are executed. The ISA generally also defines the various modes of operation of the processor, and other information that a programmer may require in order to successfully code a program for the processor to accomplish the desired operation. In other words, the ISA is essentially a description of how the processor operates when provided with an instruction stream to execute.

Because the programmer relies on the processor to operate as specified in the ISA, modifications to the ISA must be made carefully, and typically with significant input from both programmers (or software companies) and the processor designers (or processor manufacturers). The processor must implement the ISA modifications in hardware to ensure that the required behavior is provided by the processor. Thus, the definition of the changes must be carefully described and agreed upon since a new hardware generation of the processor will be needed to implement the changes. Subsequent modifications would require still further hardware generations.

SUMMARY

In one embodiment, a processor comprises a programmable map and a circuit coupled to the programmable map. The programmable map is configured to store data that identifies at least one instruction for which an architectural modification of an instruction set architecture implemented by the processor has been defined, wherein the processor does not implement the modification. The circuitry is configured to detect the instruction and cause a transition to Known Good Code (KGC), wherein the KGC is protected from unauthorized modification and is provided from an authenticated entity. The KGC comprises code that, when executed, emulates the modification.

BRIEF DESCRIPTION OF THE DRAWINGS

The following detailed description makes reference to the accompanying drawings, which are now briefly described.

Figure 1:
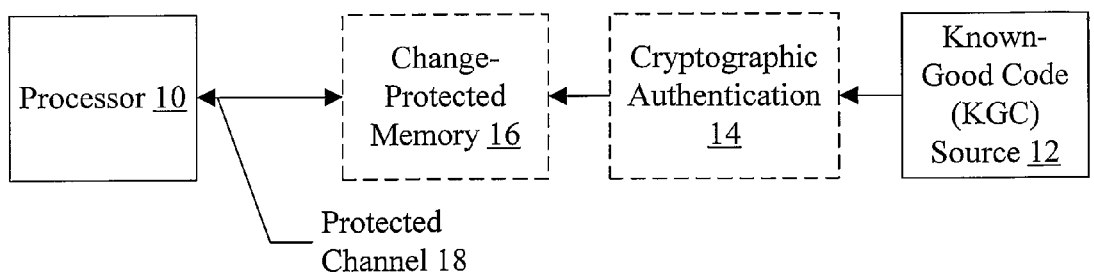
FIG. 1 is a block diagram illustrating a processor and associated Known Good Code (KGC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The description below refers to the use of Known Good Code (KGC) to implement architectural modifications for a processor in a flexible fashion (e.g. by emulating the modifications via KGC execution). Additionally, the description below also refers to other uses of KGC. Prior to describing these uses, an overview of KGC is provided.

Known Good Code (KGC) Overview

Generally, KGC may refer to code that is protected from unauthorized modification throughout its lifetime and that is provided from an authenticated entity. The authenticated entity may be an entity that is known to the manufacturer of the processor as being trustworthy, for example. The KGC may be protected from modification by providing the code in non-modifiable storage, where the communication mechanism between the storage and the processor is protected in some fashion. Alternatively, the KGC may be provided in modifiable or non-protected storage, but may be cryptographically authenticated prior to execution.

The KGC may be executed in a secure execution computing environment (SECE). An SECE may be a computing environment in which the code (KGC) and associated data cannot be modified or inspected by other code executing on the computer. The SECE may be created by processor hardware (e.g. at power up) or may be created by software that executes soon after startup to create the SECE and place the KGC in the SECE. Examples of an SECE may include, for example: the microcode engine in a processor; a processor that loads KGC from a local secure non-volatile memory into instruction and data caches of the processor, and locks the code and data in the caches; and an embedded processor or other execution engine that executes KGC out of a local non-volatile memory and communication interfaces, if any, to other devices are either authenticated, authorized, and possibly encrypted or are physically protected (e.g. within a multi-chip module). Where appropriate for clarity, KGC may be referred to as "native KGC" if it is executed by the same processor that executes other code and "non-native KGC" if it is executed by a different processor such as an embedded processor. If the term KGC is used without the "native" or "non-native" label, then the context is unambiguous or either native or non-native KGC could be used in that context.

FIG. 1 is a block diagram of a processor and associated KGC, at a conceptual level, for one embodiment. As illustrated, a processor 10 is included along with a KGC source 12. Optionally, a cryptographic authentication unit 14 and/or a change-protected memory 16 may be included as well. The communication link between the processor 10 and the KGC (either in the change-protected memory 16 or the KGC source 12) is protected (reference numeral 18 in FIG. 1).

If the processor 10 is coupled directly to the KGC source 12 via a protected channel 18, and the KGC source 12 is change-protected (i.e. the KGC source 12 cannot be changed by any unauthorized entity), the cryptographic authentication unit 14 may be eliminated. The authorized entities may include the entity that created the KGC and, in some cases, the manufacturer of the processor 10. Thus, the KGC source 12 may comprise any computer accessible storage device.

If the processor 10 is not directly coupled to the KGC source 12 via a protected channel 18, the KGC is subject to unauthorized modification either in that source 12 or during transfer to the change-protected memory 16. The cryptographic authentication unit 14 may authenticate the KGC to ensure that no such modification has occurred. For example, the cryptographic authentication unit 14 may use a root of trust for verification (RTV) from the processor to authenticate the KGC. Any authentication scheme may be used in various embodiments.

The authenticated KGC is stored in the change-protected memory 16, for fetching over the protected channel 18 by the processor 10. In some embodiments, the channel from the KGC source 12 to the change-protected memory 16 may be protected and the KGC source 12 may be change protected, and thus no cryptographic authentication may be required. Such embodiments may be implemented if the change-protected memory 16 provides lower latency access than the KGC source 12, for example, or provides some other benefit besides the change protection (e.g. lower power, concurrent access in a multiprocessor system in which each processor has a local change-protected memory 16 or shares a change-protected memory 16 with a subset of the processors, etc.).

Generally, the change-protected memory 16 may be any sort of memory that restricts or eliminates the ability to change the contents of the memory 16. Specifically, the change-protected memory 16 may restrict the ability to change its contents to only those authorized to do so. The change-protected memory 16 may be physically isolated in such a way that only an authorized entity can change the contents, or may be protected in some other fashion (e.g. locking into a cache memory).

Figure 2:
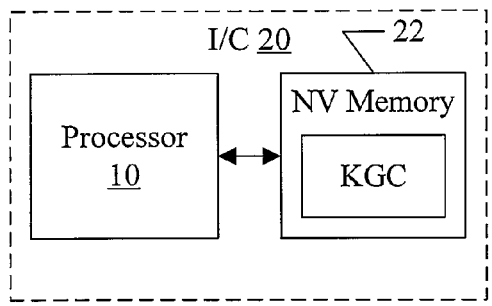
FIG. 2 is a block diagram of a first embodiment of the processor and the KGC.
Figure 3:
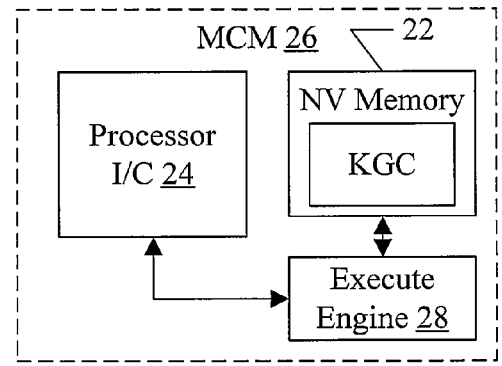
FIG. 3 is a block diagram of a second embodiment of the processor and the KGC.
Figure 4:
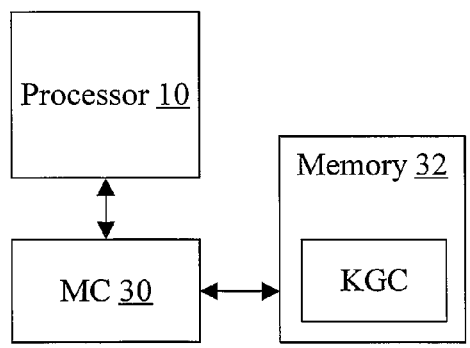
FIG. 4 is a block diagram of a third embodiment of the processor and the KGC.

FIGS. 2-4 provide several examples of how the KGC source might be implemented. While not exhaustive, the examples illustrate various embodiments that protect KGC to varying degrees. It is noted that any of the embodiments shown in FIGS. 2-4 may employ more than one processor, if desired.

FIG. 2 is a block diagram of one embodiment of an integrated circuit 20 including a processor 10 and a non-volatile memory 22 storing the KGC. The non-volatile memory 22 may thus serve as a KGC source 12, and is change-protected because it is physically included on the same integrated circuit 20 as the processor 10. That is, the non-volatile memory 22 may not be accessible external to the integrated circuit 20, and the channel to access the memory 22 is physically protected.

The non-volatile memory 22 may have various implementations. For example, the non-volatile memory 22 may be a read-only memory (ROM), or may be a battery backed RAM or solid state memory. In other embodiments, the non-volatile memory 22 may be a combination of memories (e.g. a ROM or other non-volatile memory and cache memory to which the KGC is loaded and locked). In cases in which the KGC is loaded into the cache and locked into the cache, other mechanisms may also be implemented (e.g. the locked entries may not be snooped for coherency purposes, preventing observation of the code/data via coherence mechanisms; test ports and other access points that are not part of the standard cache lookup may be disabled from accessing the locked entries; etc.).

FIG. 3 is a block diagram of another embodiment of the processor 10 and its KGC. In the embodiment of FIG. 3, a processor integrated circuit 24 (comprising one or more of the processors 10) is included in a multi-chip module (MCM) 26 with the non-volatile memory 22. The processor 10 may still execute the KGC ("native KGC") in some cases, or an execute engine 28 may be provided to execute the KGC ("non-native KGC"). The execute engine 28 may be in communication with the processor integrated circuit 24. In one embodiment, the execute engine 28 and the non-volatile memory 22 may be integrated into a single integrated circuit (e.g. a system on a chip). Specifically, the execute engine/non-volatile memory system on a chip may be a trusted platform module (TPM). In this embodiment, the non-volatile memory 22 may again serve as a processor 10 KGC source 12, and there may not be a cryptographic authentication unit 14. There may be change-protected memory in the processor integrated circuit 24 (e.g. locking caches), in some embodiments.

FIG. 4 is another embodiment in which the processor 10 is included in a system with a memory controller 30 and a memory 32 (which may be non-volatile) that stores the native KGC. In this case, the memory 32 is external to the processor 10 and thus the native KGC may be cryptographically authenticated in a cryptographic authentication unit 14 (e.g. in the memory controller 30, or in the processor 10). There may also be a change-protected memory 16 (e.g. locking caches in the processor 10).

The memory 32 may be the basic input/output system (BIOS) memory in a computer system, or may be another non-volatile memory that is included in the system.

Transition to KGC for Architectural Modifications

Because KGC is provided from an authenticated (trusted source) and is protected from unauthorized modification, KGC may be trusted by the processor manufacturer. Accordingly, KGC may be used to implement architectural modifications that have not yet been implemented in processor hardware. KGC-implemented architectural modifications may permit users (e.g. code writers and computer systems that include the processor) to use architectural extensions before they have been committed to hardware (or use architectural deletions after the deletions have been committed to hardware).

For example, the architectural extensions (e.g. new instructions, new functionality for existing instructions and their execution environment, new accelerators or other functional blocks within the processor or closely coupled to the processor, etc.) may be implemented in KGC before they are implemented in hardware. If any problems in the definition of the architectural extensions are detected while they are implemented via KGC, the problems can be corrected before the extensions are committed to hardware (e.g. by changing the extension itself). Expected benefits of the extension (e.g. higher performance, lower power consumption, etc.) can be estimated using the KGC implementation. The extension may subsequently be committed to hardware with higher confidence. Additionally, if a competitor using the same instruction set architecture introduces new features, the KGC may be used to implement the features and thus allow rapid following of a competitor's changes.

For architectural deletions (e.g. deletion of instructions that are no longer widely used or believed to be no longer widely used, or deletion of legacy modes of operation that are no longer needed or believed to be no longer needed), the KGC may be used to implement the deleted functionality. If the functionality is still in use in legacy code, for example, the legacy code will still operate correctly, albeit with lower performance. Accordingly, deletions may be implemented with the confidence that any residual use of the deleted functionality will still work properly.

To use KGC to implement architectural modifications, a mechanism to transition to KGC execution may be implemented. The mechanism may include the processor detecting that currently-executing code makes uses of the architectural modification and causing the KGC to be executed in response to the detection. The currently-executing code will be referred to herein as a user program, although the program may be executing as privileged code (e.g. the operating system or other privileged code). The transition occurs transparent to the user program, and thus the architectural extension or deletion may be emulated for the user program.

The mechanism may include a programmable map that can be programmed with data usable by the processor to detect the architectural modifications. The data programmed into the map may vary depending on how the modifications are detected. For example, in one embodiment illustrated in FIGS. 5 and 6, the data may comprise all or a portion of the instruction's encoding (e.g. opcode, opcode modifiers, operand fields, etc.). The data may also include various mode indications from one or more configuration/control registers that indicate a current operating mode of the processor. The data may still further include an address or data generated during execution of the instruction, such as the embodiment illustrated in FIGS. 7 and 8. The data may include any combination of the instruction encoding and data/address generated during execution, and/or any other event that may occur during execution (e.g. exception, a particular type of exception, interrupt, a particular type of interrupt, etc.). The programmable map may be any type of storage or combination of storage (e.g. registers addressable by instructions executed by the processor, a memory array, etc.).

Figure 5:
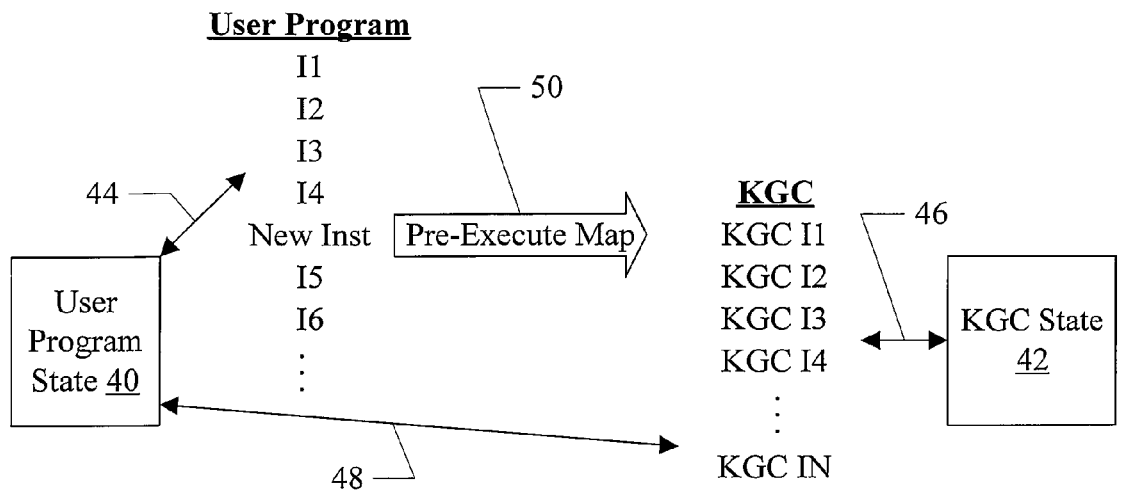
FIG. 5 is a block diagram illustrating a first embodiment of a transition mechanism for KGC.

FIG. 5 is a block diagram illustrating one embodiment of a transition mechanism that occurs prior to the detected instruction reaching execute. In FIG. 5, a user program is illustrated that includes a new instruction (corresponding to an architectural extension). Similar operation may occur for a user program that includes a deleted instruction, or an instruction whose operation has been changed in an architectural modification. Also illustrated in FIG. 5 is the KGC, a user program state 40, and a KGC state 42. The user program state 40 comprises architectural state of the processor that is visible to the user program (e.g. register values). The KGC state 42 comprises state of the processor that is only visible when KGC code is executing. That is, the user program code cannot read or write the KGC state 42. Thus, the KGC state 42 is private to KGC, and can be used as part of emulating architectural modifications that are not implemented by processor hardware. The KGC state 42 includes at least some processor state, such as one or more registers. The registers may be used to store data generated/used by KGC and/or may store pointers to memory that is reserved for KGC use, for example. The registers may also store various configuration/control data that control how KGC is executed. As illustrated in FIG. 5, the user program has access to the user program state 40 (arrow 44), but not the KGC state 42. The KGC has access to the KGC state 42 (arrow 46) as well as the user program state (arrow 48).

The user program comprises a stream of instructions such as instructions I1, I2, I3, etc. as shown in FIG. 5. Generally, the instructions I1, I2, I3, I4, I5, and I6 are instructions defined in the instruction set architecture implemented by the processor 10 (referred to as "macro instructions"). One of the instructions ("New Inst" in FIG. 5) may be a newly defined instruction according to the architectural modifications implemented IS by the KGC. That is, the instruction may be undefined in the architecture as implemented in the processor hardware. If allowed to execute, the instruction would cause an exception on the processor 10. Alternatively, the instruction may be previously defined but may use new functionality that is part of the architectural modification emulated by the KGC. The processor 10 may include a pre-execute stage mapping (arrow 50) to the KGC for the instruction, preventing the exception (if any) and causing the KGC to be fetched and executed. The transition to KGC illustrated by the arrow 50 may also enable the KGC state 42 so that it is visible to the executing instructions within the KGC. In some cases, the processor 10 may elevate the privilege level for execution of KGC to ensure that KGC is able to implement its specified function, but may also ensure that any events that would cause an exception for the user program and are not needed for KGC execution will cause exceptions during KGC execution. Thus, the privilege elevation may be limited to certain resources, only specific parts of the overall privileged protection scheme, etc.

The KGC also includes a stream of instructions KGC I1 to KGC IN as shown in FIG. 5. The KGC instructions are also macro instructions, as defined in the instruction set architecture implemented by the processor 10 (without the architectural modifications emulated by the KGC). The KGC instructions, when executed, emulate the architectural modifications that are not implemented in the processor 10. The KGC may complete with instructions that typically cause execution to return to user program at the instruction following the new instruction (e.g. 15 in FIG. 5), although continuing execution at another point is also possible (e.g. a subsequent instruction in the user program if more than one instruction was emulated, an exception or other error handling routine if an error is detected, etc.).

In a similar fashion, the KGC may emulate functionality that has been deleted via architectural modifications that have been implemented in the processor 10. For example, if an instruction has been deleted from the architecture, the KGC may emulate that instruction so that legacy user programs will still function correctly. Still further, the is KGC may be used to provide proper operation if the processor 10 implements an instruction incorrectly (e.g. a bug is found in the processor hardware).

Figure 6:
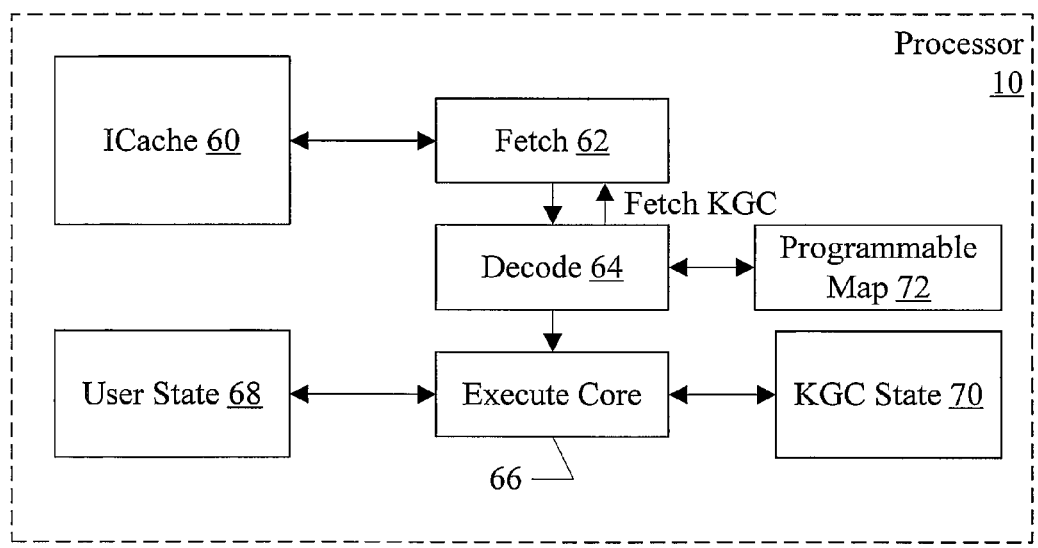
FIG. 6 is a block diagram of one embodiment of the processor implementing the first embodiment of the transition mechanism.

FIG. 6 is a block diagram of one embodiment of the processor 10 that may implement a pre-execution mapping of instructions to KGC. In the illustrated embodiment, the processor 10 includes an instruction cache (ICache) 60, a fetch unit 62, a decode unit 64, an execute core 66, user state storage 68, KGC state storage 70, and a programmable map 72. The fetch unit 62 is coupled to the ICache 60 and the decode unit 64, which is further coupled to the programmable map 72 and the execute core 66. The execute core 66 is further coupled to the user state storage 68 and the KGC state storage 70.

The processor 10 may execute a user program, with the fetch unit 62 fetching the instructions from the ICache 60 and providing the fetched instructions to the decode unit 64. The decode unit 64 may decode the instructions and supply the decoded instructions to the execute core 66 for execution. In some cases, the decode unit 64 may provide operand read requests to the user state storage 68 (and the KGC state storage 70, if KGC is being executed).

Additionally, the decode unit 64 may be coupled to the programmable map 72, which may be programmed with data identifying one or more instructions that are to cause a transition to KGC execution. The programmable map 72 may be programmed at power up of the processor 10, before any user programs are to be executed. The programmable map 72 may be addressable by instructions for programming purposes, or hardware circuitry may read the map from a designated computer system location into the programmable map 72 as part of preparing the processor 10 to execute instructions.

In this embodiment, the data stored in the programmable map 72 may identify all or part of an instruction that is to cause a transition to KGC execution. For example, opcode fields, modifiers, operand specifiers, etc. in the instruction may be used. Additionally, various mode indications may be included in the programmable map data, in some embodiments.

If the decode unit 64 detects an instruction indicated in the programmable map 72, the decode unit 64 may discard the instruction (and subsequent instructions in the user program code stream) and may signal the fetch unit 62 to fetch the KGC (Fetch KGC signal in FIG. 6). Native KGC may be locked in the ICache 60, for example. Alternatively, the native KGC may be in non-volatile memory on the same chip or in the same MCM, or may be in isolated system memory. In other embodiments, the decode unit 64 may signal an external execute engine such as that shown in FIG. 3 to execute non-native KGC.

The decode unit 64 may comprise any decode circuitry. The decode unit may comprise one or more hardware decoders configured to decode instructions (in parallel on different instructions, if more than one decoder is provided). The decode unit may also include a microcode unit configured to dispatch microcode routines for more complex instructions.

The execute core 66 may comprise any execution configuration (e.g. superscalar, superpipelined, in-order, out-of-order, etc.). Additionally, the execute core 66 may only permit access to the KGC state storage 70 if the native KGC is executing. The user state storage 68 and the KGC state storage 70 may each comprise any semiconductor storage (e.g. registers, a register file, memory array, etc.).

Figure 7:
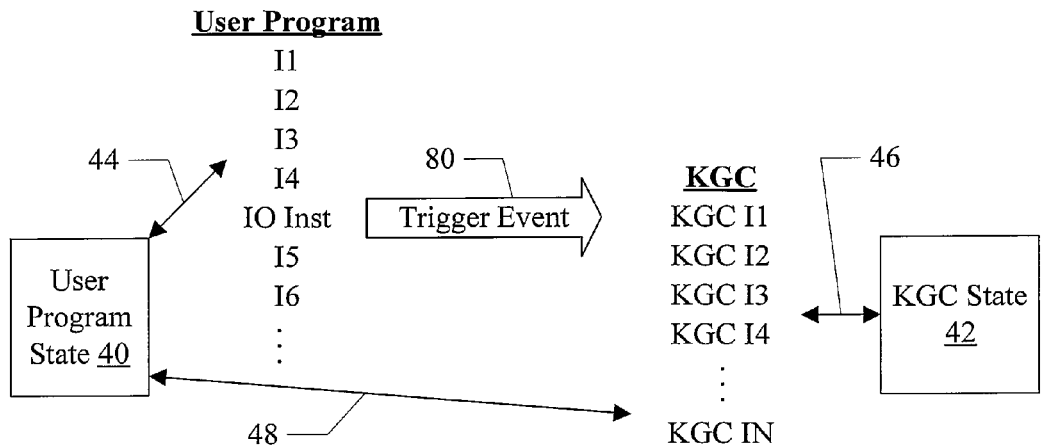
FIG. 7 is a block diagram illustrating a second embodiment of a transition mechanism for KGC.

FIG. 7 is a block diagram illustrating another embodiment of a transition mechanism that occurs subsequent to executing the detected instruction (that causes a transition to KGC execution) or during execution of the detected instruction. Similar to FIG. 5, FIG. 7 illustrates a user program and the KGC. In this embodiment, the instruction that implements an architectural modification is executed, and an event occurring during its execution is used to detect that KGC is to be executed. Also illustrated in FIG. 7 is the user program state 40 and the KGC state 42, similar to FIG. 5. Similar to FIG. 5, the user program has access to the user program state 40 (arrow 44), but not the KGC state 42. The KGC has access to the KGC state 42 (arrow 46) as well as the user program state (arrow 48).

The user program comprises a stream of instructions such as instructions I1, I2, I3, etc. as shown in FIG. 7. Generally, the instructions I1, I2, I3, I4, IO Inst, I5, and I6 are macro instructions. The IO Inst is an instruction that maps to input/output (I/O), either memory-mapped I/O or the so called in/out I/O (IOIO). IOIO corresponds to the IN and OUT instructions in the x86 instruction set. Generally, an IOIO instruction may be any instruction which produces an I/O cycle, where the I/O cycle occurs to an I/O address space that is separate from the memory address space and is recognized by the processor as being separate. The IO Inst may be detected by the processor 10 during execution, via a trigger event (arrow 80) that causes a transition to KGC execution.

In one implementation, the trigger event may be the address generated during execution of the IO Inst. Alternatively, the data read or written during execution may be the trigger event, or any other event during execution of the IO Inst may be the trigger event. In other embodiments, the instruction need not be an I/O instruction, as long as it causes an event that can be detected as a trigger event by the processor 10. Other trigger events may include a timer expiration, error detection (e.g. ECC error) or any other detectable change in machine state.

Figure 8:
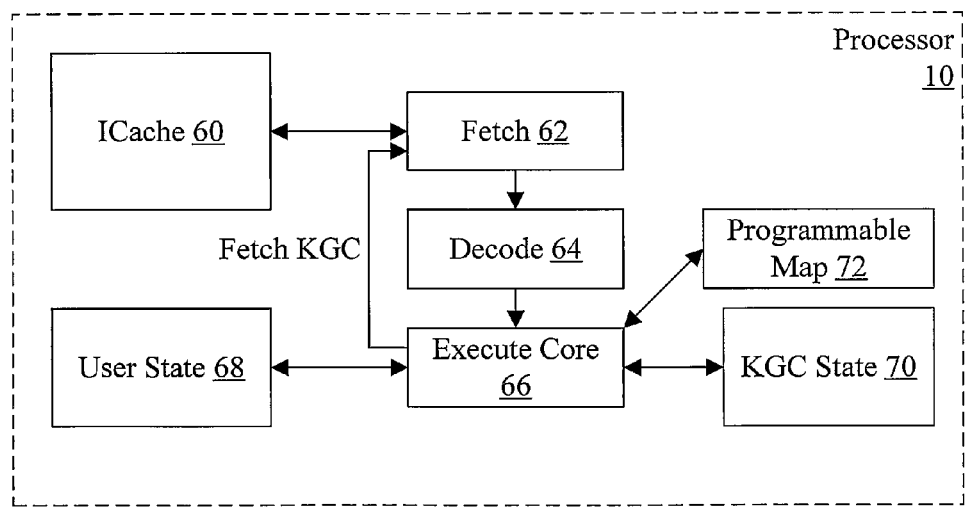
FIG. 8 is a block diagram of one embodiment of the processor implementing the second embodiment of the transition mechanism.

FIG. 8 is a block diagram of another embodiment of the processor 10 that may implement a mapping of instructions to KGC during or after execution, based on a trigger event. Similar to the embodiment of FIG. 6, the embodiment of FIG. 8 includes the instruction cache (ICache) 60, the fetch unit 62, the decode unit 64, the execute core 66, the user state storage 68, the KGC state storage 70, and the programmable map 72. The fetch unit 62 is coupled to the ICache 60 and the decode unit 64, which is further coupled to the execute core 66. The execute core 66 is further coupled to the user state storage 68 and the KGC state storage 70.

In the embodiment of FIG. 8, it is the execution core 66 that is coupled to the programmable map 72 and which generates the fetch KGC indication to the fetch unit 62 (or an external execution engine). The data in the programmable map 72 may identify an address, a range of addresses, data, a range of data, exceptions, interrupts, etc. that may be a trigger event during execution of the instruction to cause a transition to KGC. The data may also include data identifying the instruction (e.g. opcode and other encodings) used in conjunction with the execute-generated data to identify an instruction that causes a transition to KGC (or instead of the execute-generated data). The data may still further include various mode indications, as mentioned above.

In addition to signalling that KGC should be fetched/executed, the execution core 66 may also synchronize to the instruction corresponding to the trigger event (hold off execution of the first KGC instruction until the triggering instruction and all preceding instructions have completed execution and not executing instructions subsequent to the triggering instruction in the user program until the KGC execution has completed). The execution core 66 may also cause the decode unit 64 and any other units before the execute stage of the pipeline to purge user program instructions, or the fetch KGC signal may be used to signal a purge.

Other Uses of KGC

The previous section discussed the use of KGC for implementing architectural modifications. Other uses for KGC are also contemplated.

Figure 9:
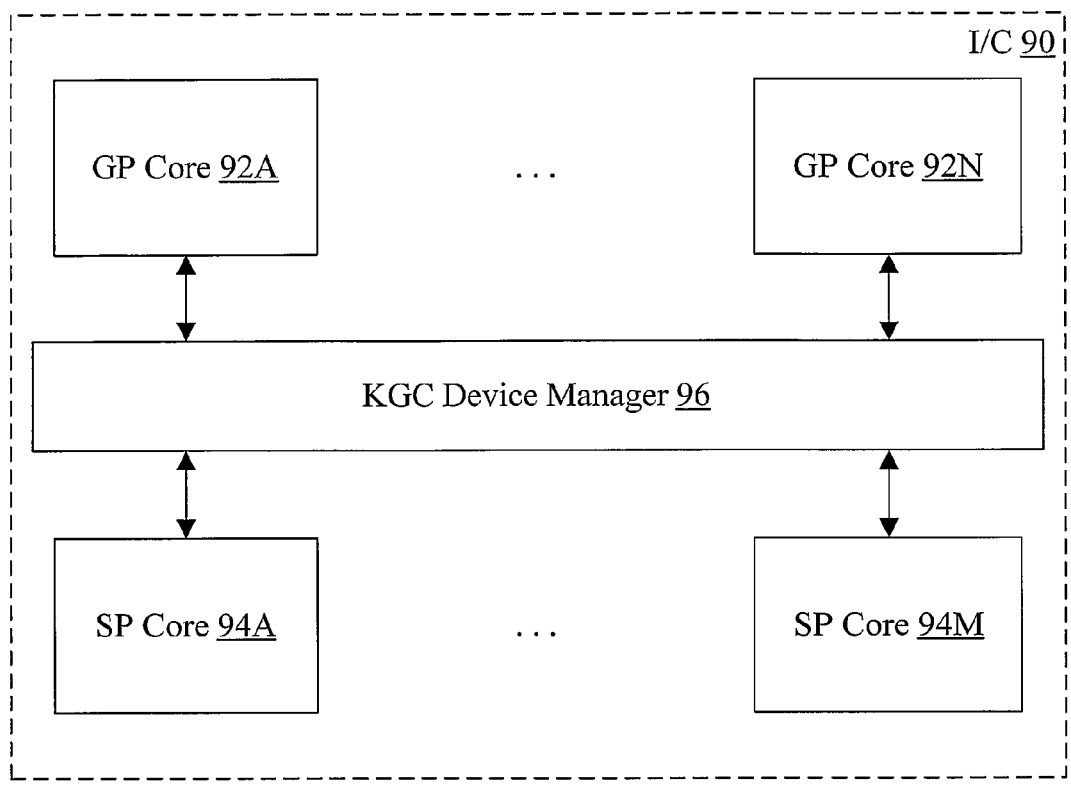
FIG. 9 is a block diagram of one embodiment of a multi-core integrated circuit using KGC as a device manager.

For example, FIG. 9 illustrates an integrated circuit 90 that includes one or more general-purpose (GP) cores 92A-92N and one or more special-purpose (SP) cores 94A-94M, all integrated onto a single silicon substrate (or included in an MCM, in other implementations). The GP cores 92A-92N may be processors similar to the processor 10, designed to execute instructions as defined in an instruction set architecture. The SP cores may be accelerators, added functionality, or other devices. For example, the SP cores may be graphics processing units (GPUs) optimized for graphics operations, cryptographic accelerators configured to perform cryptography tasks, trusted platform modules, low power/low performance processor cores that can be used for power management, and other desired devices. If more than one SP core is included, the SP cores may differ from each other. Generally, the SP cores 94A-94M may comprise any desired circuitry provided in addition to the GP cores 92A-92N.

The KGC in the embodiment of FIG. 9 may be a device manager 96 which controls access by the GP cores 92A-92N to the SP cores 94A-94N. The KGC may provide an application programming interface (API) that can be used by user programs executing on the GP cores 92A-92N to access the SP cores 94A-94M. Thus, the SP cores 94A-94M may be changed, including how the cores are accessed, and the GP cores 92A-92N (and user programs) may be insulated from those changes. Additionally, the KGC device manager 96 may handle prioritization of tasks and the sharing of SP cores 94A-94M among the GP cores 92A-92M. For example, an SP core 94A-94M may be performing a lower priority task when a higher priority task is requested. The KGC device manager 96 may interrupt the SP core, save the state corresponding to the lower priority task, and begin the higher priority task. The KGC device manager 96 may have a secure storage location to hold the state of different tasks, so that the state is not exposed to an unrelated user program. That is, one program's state is hidden from the other program by the KGC. Thus, the KGC device manager 96 may provide security. If an SP core is a cryptographic device, for example, the keys and other sensitive data used in the cryptography may not be visible to an unrelated process. Additionally, the KGC device manager 96 may emulate an SP core, allowing the core to be removed or allowing for virtual cores if all of the physical cores are busy when a request is received.

The KGC device manager 96 may also control which features are enabled or disabled within the integrated circuit 90. Such feature control may have a variety of uses. For example, a pay-as-you-go model may be supported in which features that have been purchased are enabled, and when the purchase expires they can be disabled. Features can be disabled for an initial sale, but later enabled if the customer provides an additional payment.

Figure 10:
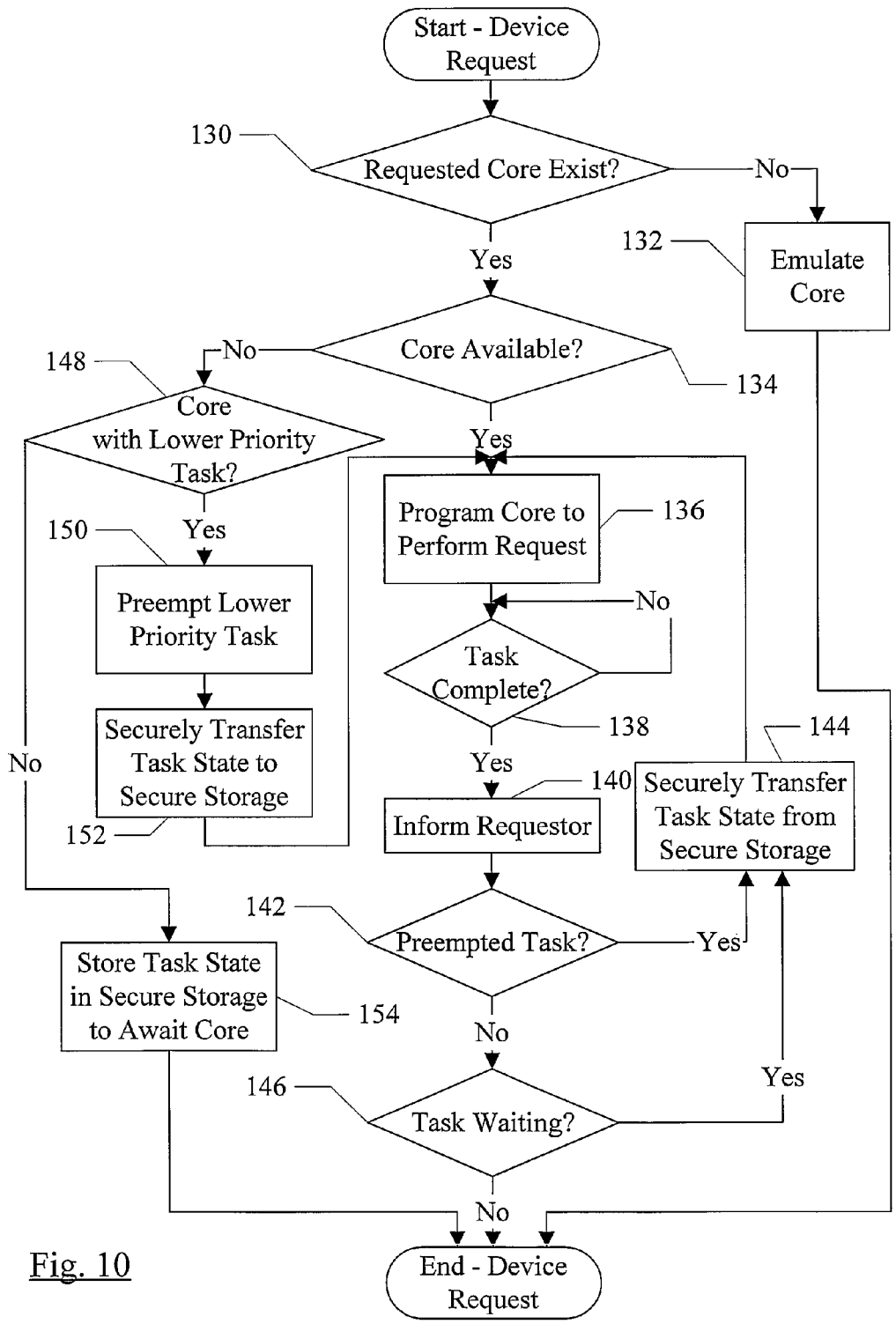
FIG. 10 is a flowchart illustration operation of one embodiment of the KGC as a device manager.

An example of the operation of one embodiment of the KGC as device manager 94 in response to a request from a GP core 92A-92N is illustrated in the flowchart of FIG. 10. While the blocks are shown in FIG. 10 for ease of understanding, other orders may be used. The KGC may comprise instructions which, when executed, implement the flowchart of FIG. 10.

The KGC may determine if the requested core exists in the integrated circuit 90 (decision block 130). If the requested core does not exist (e.g. the core was removed or not included in a later design of the integrated circuit 90—decision block 130, "no" leg), the KGC may emulate the non-existent core (block 132). Alternatively, if the requested core does not exist on the integrated circuit 90 but equivalent hardware is available elsewhere in a computer system including the processor, the KGC may communicate with the external hardware to perform the requested task. By providing the check for existence and the emulation, the KGC may permit programs that rely on the SP cores 94A-94M to function even if the SP cores are not included.

If the requested core exists in the integrated circuit 90 (decision block 130, "yes" leg), the KGC may determine if the requested core 94A-94M is available (decision block 134). There may be more than one core of a given type, and if any of the cores 94A-94M of the requested type is available (e.g. enabled and idle), that core 94A-94M may be assigned to perform the task. If the requested core 94A-94M is available (decision block 134, "yes" leg), the KGC may program the core to perform the requested task (block 136). Once the task completes (decision block 138, "yes" leg), the KGC may inform the requester (block 140). Determining that the task is complete may take a variety of forms. For example, the KGC may poll the assigned core 94A-94M, or the assigned core may assert an interrupt upon completion. If the completed task preempted another task on the core (decision block 142, "yes" leg), the KGC may securely transfer the task state for the preempted task from secure storage (block 144) and may program the core to perform the request beginning at the stored state (block 136), which may then continue to execute as previously described. The secure storage may be KGC-allocated data storage that is not visible to code other than the KGC (e.g. located data cache storage, writeable NVRAM storage, etc.) If the completed task did not preempt a task and there is a task waiting to execute (in the secure storage—decision block 146, "yes" leg), the KGC may securely transfer the task state for the waiting task from secure storage (block 144) and may program the core to perform the waiting task (block 136), which may then execute as previously described.

If the requested core is not available (decision block 134, "no" leg), the KGC may determine if a requested core is performing a lower priority task than the requested task (decision block 148). Priority may be assigned to tasks using any desired priority scheme. The scheme may be associated with the requested tasks (e.g. some types of tasks may be higher priority than other types), or may be assigned based on the relative priority of the user programs that generated the requests. If a lower priority task is being performed by a core 94A-94M (decision block 148, "yes" leg), the KGC may preempt the lower priority task to perform the higher priority task (block 150). The KGC may securely transfer the state of the preempted task to secure storage, so that the state is hidden from other user programs (and even from the initiating user program itself) (block 152). The KGC may then program the core to perform the request (block 136), which may then execute as previously described. If there is not core performing a lower priority task (decision block 148, "no" leg), the KGC may store the task request state in secure storage to await an available core (block 154). Alternatively, the KGC may emulate the requested core, if desired.

Another contemplated use of KGC relates to the x86 (or IA-32, and extensions such as AMD-64™) instruction set. The x86 instruction set controls privilege via a four-level privilege scheme. The most privileged level is referred to as ring 0, and is often necessary for operating system kernel operations. However, there is no partitioning within ring 0. Any task operating at ring 0 can effect any state in the machine, even state to which that task should have no access. The ring 0 configuration allows erroneous code to cause problems for unrelated operations, and also is a security concern.

Figure 11:
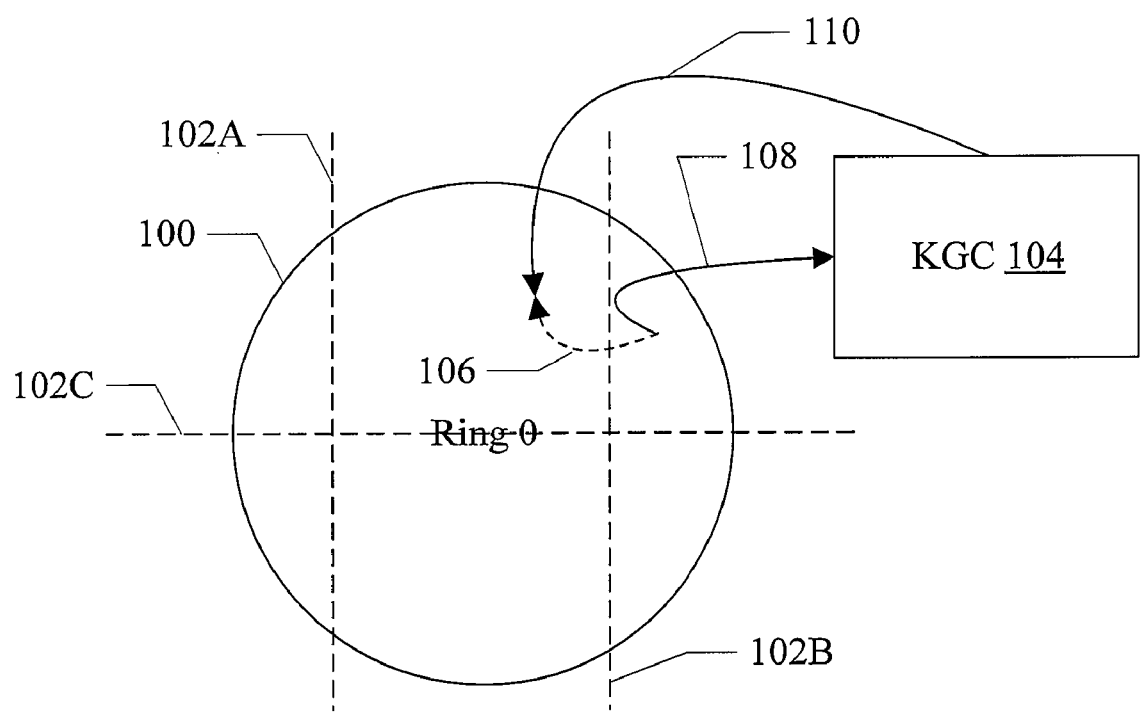
FIG. 11 is a block diagram of one embodiment of using KGC as a mechanism for dividing ring 0 into protected zones.

KGC may be used to counter these effects by partitioning ring 0. FIG. 11 illustrates the partitions, with ring 0 illustrated as a circle 100 and the lines 102A-102C illustrating the partitions. When code that belongs in one partition attempts to access resources that are not part of that partition, the KGC 104 may intercept the access and determine if it is permissible or not. For example, an access from one partition to another is illustrated as the dotted arrow 106. Instead of allowing the access, the access may instead be routed to the KGC 104 (solid arrow 108). If the access is permitted, the KGC 104 may perform the access on behalf of the requester (solid arrow 110). In this fashion, the partitions may be insulated from each other. If a partition is penetrated by malicious code, that partition may be affected but the impact on other partitions may be reduced or even eliminated.

The partitioning illustrated in FIG. 11 may be implemented in a variety of ways. For example, different memory ranges may be assigned to different partitions, which may be programmed into the programmable map 72. If a memory address that is outside of the partition of the code being executed is generated, a transition to KGC may occur. Similarly, configuration/control register state may be divided among the partitions, and accesses to the configuration/control registers may be limited based on the current partition by programming the programmable map 72 to detect impermissible registers as operands.

While KGC may be used to implement new architectural features, in some cases the KGC alone may not provide the desired performance that a hardware implementation would provide. In one embodiment, the KGC may manage an interface to a programmable logic unit that is included on an integrated circuit with the processor. At least a portion of the functionality assigned to the KGC may be implemented in to the programmable logic unit, and thus may be performed at higher "hardware-like" speeds. The remaining functionality may be implemented in the KGC itself.

Figure 12:
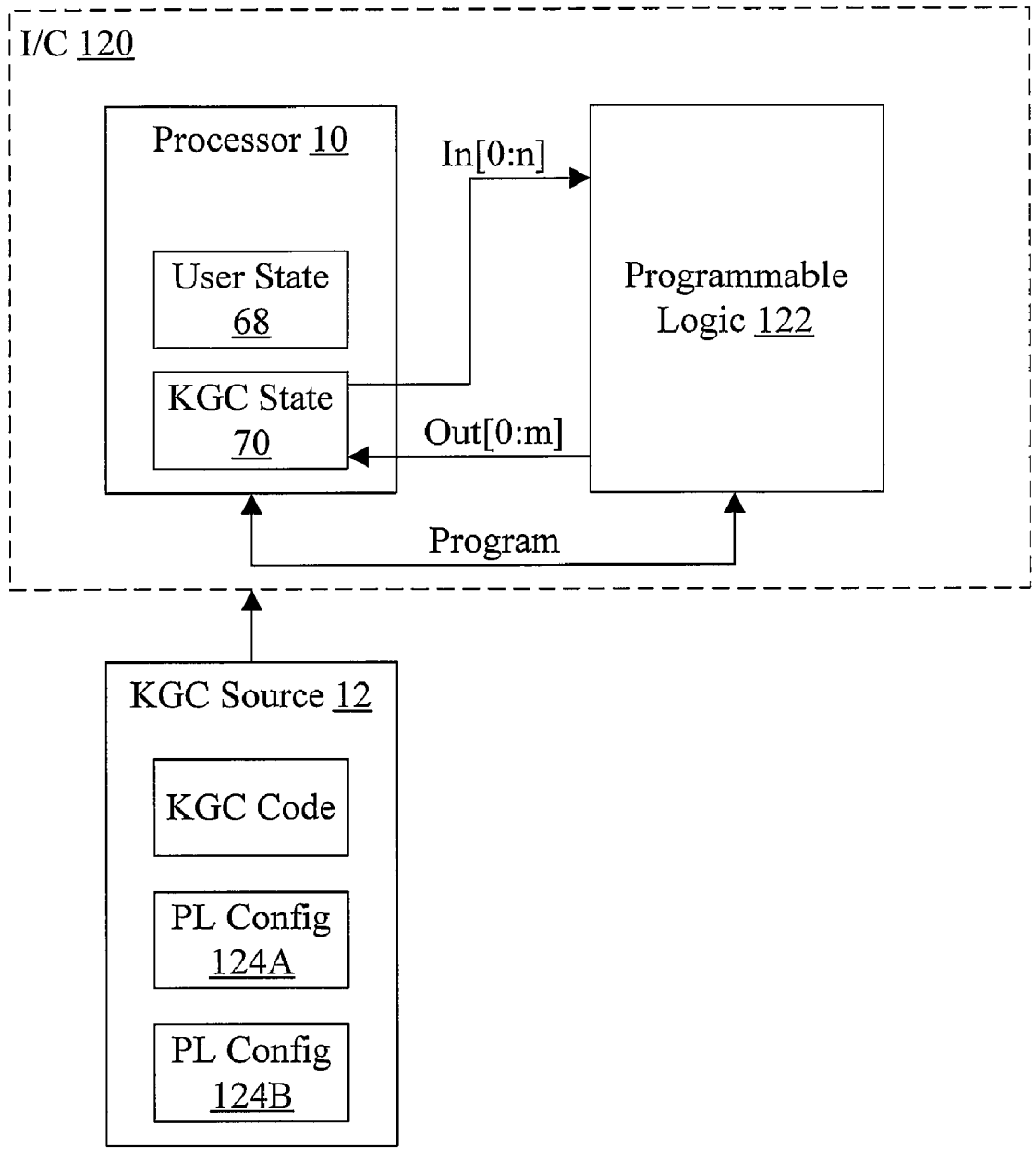
FIG. 12 is a block diagram of one embodiment of using KGC in conjunction with programmable logic on an integrated circuit with the processor.

FIG. 12 is a block diagram of one embodiment of an integrated circuit 120 that includes a processor 10 (including user state storage 68 and KGC state storage 70) and a programmable logic unit 122. Also shown in FIG. 12 is the KGC source 12, which stores the KGC and at least one programmable logic configuration 124A. In some cases, additional programmable logic configurations such as programmable logic configuration 124B are stored as well.

The programmable logic configuration may be loaded into the programmable logic unit 122 using the program interface ("Program" in FIG. 12). The program interface may be isolated from the external inputs/outputs of the integrated circuit 120, and thus may only be programmed by KGC executing on the processor 10. The KGC may read the configuration 124A or 124B from the KGC source 12 and may write the configuration to the programmable logic unit 122 over the program interface.

In some implementations, the configuration of the programmable logic unit 122 may be selected during power up, and the KGC may load the configuration into the programmable logic unit 122 during power up and retain the configuration thereafter. In other implementations, the configuration of the programmable logic unit 122 may be changed in operation by selecting another configuration from the KGC source 12 and reprogramming the programmable logic unit 122. In such implementations, the operation of the programmable logic unit 122 may change based on the task being performed by the KGC. For example, if the KGC included two computation-intensive tasks that benefit from the programmable logic unit 122, the configuration for the more frequently used task may be loaded into the programmable logic unit 122. If the other task (that is not loaded into the programmable logic unit 122) is requested, the programmable logic unit 122 may be changed. Alternatively, the programmable logic unit 122 may only be changed if the other task is requested more frequently and the KGC may perform the task in software until the determination is made to change the programmable logic unit 122 configuration.

The programmable logic unit may receive inputs (In[0:n] in FIG. 12) and may generate outputs (Out[0:m] in FIG. 12). The inputs may be sourced from KGC state storage 70 and the outputs may be received by the KGC state storage 70, providing the mechanism for the KGC to drive the programmable logic unit 122 and to receive results from the programmable logic unit 122. For example, the inputs and outputs may be mapped to bits in registers within the KGC state storage 70.

The programmable logic unit 122 may comprise any type of non-permanent programmable logic. For example, field programmable gate array (FPGA) or complex programmable logic device (CPLD) technology may be used. Flash, erasable read only memories, or random access memory technologies may be used in the programmable logic unit 122.

Numerous variations and modifications will become apparent to those skilled in the art once the above disclosure is fully appreciated. It is intended that the following claims be interpreted to embrace all such variations and modifications.

What is claimed is:

1. A processor comprising:
a programmable map configured to store data that identifies at least one instruction for which an architectural modification of an instruction set architecture implemented by the processor has been defined, wherein the processor does not implement the architectural modification, and wherein the data in the map includes at least a portion of the instruction encoding; and
circuitry coupled to the programmable map, wherein the circuitry is configured to detect the instruction and cause a transition to Known Good Code (KGC), wherein the KGC is protected from unauthorized modification and is provided from an authenticated entity, and wherein the KGC comprises code that, when executed, emulates the modification.

2. The processor as recited in claim 1 wherein the circuitry is configured to cause the transition to KGC prior to the instruction reaching an execution stage in the processor.

3. A processor comprising:
a programmable map configured to store data that identifies at least one instruction for which an architectural modification of an instruction set architecture implemented by the processor has been defined, wherein the processor does not implement the architectural modification; and
circuitry coupled to the programmable map, wherein the circuitry is configured to detect the instruction and cause a transition to Known Good Code (KGC), wherein the KGC is protected from unauthorized modification and is provided from an authenticated entity, and wherein the KGC comprises code that, when executed, emulates the modification, and wherein the circuitry is configured to cause the transition to KGC during execution of the instruction.

4. The processor as recited in claim 3 wherein the data in the map identifies an event that occurs during execution of the instruction.

5. The processor as recited in claim 3 wherein the data in the map corresponds to data generated during execution of the instruction.

6. The processor as recited in claim 3 wherein the data in the map corresponds to an address generated during execution of the instruction.

7. The processor as recited in claim 1 further comprising a user state storage and a KGC state storage, wherein the KGC state storage is accessible in the processor only when the KGC is being executed by the processor.

8. The processor as recited in claim 1 wherein the modification is an addition of functionality to the instruction set architecture.

9. The processor as recited in claim 1 wherein the modification is a deletion of functionality to the instruction set architecture, and wherein the KGC emulates the deleted functionality to ensure compatibility with previously-written programs.

10. The processor as recited in claim 1 wherein the programmable map is further programmable to detect an instruction that the processor implemented in a faulty fashion, wherein the KGC is configured to emulate correct operation of the instruction.

11. A method comprising:
- programming data that identifies at least one instruction into a processor, wherein the at least one instruction comprises at least one instruction for which an architectural modification of an instruction set architecture implemented by the processor has been defined, and wherein the data in the map includes at least a portion of the instruction encoding; and
- detecting the at least one instruction in a code sequence responsive to the data; and
- causing a transition to Known Good Code (KGC), wherein the KGC is protected from unauthorized modification and is provided from an authenticated entity, and wherein the KGC comprises code that, when executed, emulates the modification.

12. The method as recited in claim 11 wherein the detecting and the causing occur prior to the instruction reaching an execution stage in the processor.

13. The method as recited in claim 11 wherein the detecting and the causing occur during execution of the instruction.

14. The method as recited in claim 13 wherein the data in the map identifies an event that occurs during execution of the instruction.

15. The method as recited in claim 13 wherein the data in the map corresponds to data generated during execution of the instruction.

16. The method as recited in claim 13 wherein the data in the map corresponds to an address generated during execution of the instruction.

17. The method as recited in claim 11 wherein the modification is an addition of functionality to the instruction set architecture.

18. The method as recited in claim 11 wherein the modification is a deletion of functionality to the instruction set architecture, and wherein the KGC emulates the deleted functionality to ensure compatibility with previously-written programs.

19. The processor as recited in claim 1 wherein the portion of the instruction encoding comprises an opcode of the instruction.

20. The method as recited in claim 11 wherein the portion of the instruction encoding comprises an opcode of the instruction.

* * * * *